United States Patent  
Kojima (10) Patent No.: US 7,515,604 B2  
(45) Date of Patent: Apr. 7, 2009

(54) TRANSMITTER, RECEIVER, AND METHODS (75) Inventor: Toshiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 946 days.

(21) Appl. No.: 10/356,973

(22) Filed: Feb. 3, 2003

(65) Prior Publication Data

US 2003/0152162 A1  Aug. 14, 2003

(30) Foreign Application Priority Data

Feb. 5, 2002  (JP) .............................. P2002-028702

(51) Int. Cl.
*H04J 3/16* (2006.01)
*H04J 3/22* (2006.01)

(52) U.S. Cl. ........................................... 370/466

(58) Field of Classification Search ........... 370/466, 370/535, 352, 463, 506, 477, 349, 389, 338, 370/277, 395.64, 394, 311, 428, 252, 474, 370/396, 364, 412, 395, 241, 229, 230, 470, 370/471, 354, 400, 392, 356, 401, 503, 469, 370/473; 709/247, 228, 218, 224, 204, 206, 709/231, 229, 230, 238, 245, 236, 223, 250, 709/201, 232, 234; 375/295, 316; 455/67.11; 714/807

See application file for complete search history.

(56) References Cited

U.S. PATENT DOCUMENTS

| 5,850,526 | A  | * | 12/1998 | Chou ........................... 709/247 |
| 6,212,190 | B1 | * | 4/2001  | Mulligan ..................... 370/400 |
| 6,279,140 | B1 | * | 8/2001  | Slane .......................... 714/807 |
| 6,341,129 | B1 | * | 1/2002  | Schroeder et al. ........... 370/354 |
| 6,345,302 | B1 | * | 2/2002  | Bennett et al. .............. 709/236 |
| 6,353,856 | B1 | * | 3/2002  | Kanemaki .................... 709/229 |
| 6,366,698 | B1 | * | 4/2002  | Yamakita ..................... 382/187 |
| 6,590,902 | B1 |   | 7/2003  | Suzuki et al. |
| 6,671,734 | B1 |   | 12/2003 | Shimizu |
| 6,754,200 | B1 | * | 6/2004  | Nishimura et al. .......... 370/349 |
| 6,819,686 | B1 | * | 11/2004 | Frannhagen et al. ........ 370/535 |
| 6,954,797 | B1 | * | 10/2005 | Takeda et al. ............... 709/236 |

(Continued)

FOREIGN PATENT DOCUMENTS

JP    2001-339462    12/2001

OTHER PUBLICATIONS

Teruyuki Hasegawa, Toru Hasegawa, Toshihiko Kato, KDD R&D Laboratories, Inc., A Study on TCP Throughput Acceleration Mechanism using On-board CPU, pp. 505-510.

*Primary Examiner*—Wing F Chan  
*Assistant Examiner*—Prenell P Jones  
(74) *Attorney, Agent, or Firm*—Frommer Lawrence & Haug LLP; William S. Frommer (57) ABSTRACT

A computer capable of performing communications processing using a protocol at high speed in simple and low cost configuration is provided. After an SD-RAM controller stores AV data inputted via an AV interface in an AV buffer circuit, a packet processing unit, for example, generates jumbo packet data of 32 KB. A PCI bus interface outputs data required for transmitting processing of the jumbo packet data to a CPU, and the CPU generates header data. A packet processing unit, according to the header data, splits the jumbo packet data and generates Ethernet packet data of a maximum of 1518 byte. The SD-RAM controller transmits the applicable data from a MAC circuit.

13 Claims, 6 Drawing Sheets

U.S. PATENT DOCUMENTS

| | | | |
|---|---|---|---|
| 6,963,561 B1* | 11/2005 | Lahat | 370/356 |
| 2001/0023460 A1* | 9/2001 | Boucher et al. | 709/250 |
| 2001/0048681 A1 | 12/2001 | Bilic et al. | |
| 2001/0053148 A1 | 12/2001 | Bilic et al. | |
| 2003/0005103 A1* | 1/2003 | Narad et al. | 709/223 |
| 2003/0108044 A1* | 6/2003 | Hendel | 370/392 |
| 2003/0147369 A1* | 8/2003 | Singh et al. | 370/338 |
| 2003/0165160 A1* | 9/2003 | Minami et al. | 370/466 |
| 2004/0148382 A1* | 7/2004 | Narad et al. | 709/223 |

\* cited by examiner

| No | FIELD | DATA GENERATION METHOD |
|----|-------|------------------------|
| 1 | VERSION | 4h |
| 2 | HEADER LENGTH (HLEN) | 5 OR F |
| 3 | SERVICE TYPE | COPY FROM IP HEADER |
| 4 | TOTAL LENGTH | 0000h |
| 5 | IDENTIFICATION | COPY FROM IP HEADER |
| 6 | FLAGS | 0000h |
| 7 | FRAGMENT OFFSET | 0000h |
| 8 | TIME TO LIVE | COPY FROM IP HEADER |
| 9 | PROTOCOL | TCP=06h |
| 10 | HEADER CHECKSUM | HARDWARE ARITHMETIC |
| 11 | SOURCE ADDRESS (SOURCE IP ADDRESS) | COPY FROM IP HEADER |
| 12 | DESTINATION ADDRESS (DESTINETION IP ADDRESS) | COPY FROM IP HEADER |
| 13 | IP OPTIONS, PADDING | NO GENERATION |

FIG. 4

| No | FIELD | DATA GENERATION METHOD |
|---|---|---|
| 1 | SOURCE PORT NUMBER (SOURCE PORT) | COPY FROM TCP HEADER |
| 2 | DESTINATION PORT NUMBER (DESTINATION PORT) | COPY FROM TCP HEADER |
| 3 | SEQUENCE NUMBER | HARDWARE ARITHMETIC |
| 4 | ACKNOWLEDGEMENT NUMBER | HARDWARE ARITHMETIC |
| 5 | DATA OFFSET/ HEADER LENGTH (HLEN) | 5 OR F |
| 6 | RESERVED | 0 |
| 7 | CONTROL BIT (CODE BIT) | OR OF EACH PACKET |
| 8 | WINDOW | COPY FROM TCP HEADER |
| 9 | CHECKSUM | HARDWARE ARITHMETIC |
| 10 | URGENT POINTER | 0 |
| 11 | OPTIONS, PADDING | NIL |

TRANSMITTER, RECEIVER, AND METHODS

CROSS REFERENCES TO RELATED APPLICATIONS

The present document is based on Japanese Priority Document JP 2002-028702, filed in the Japanese Patent Office on Feb. 5, 2002, the entire contents of which being incorporated herein by reference.

BACKGROUND OF THE INVENTION

1. Field of the Invention

The present invention relates to a transmitter and a receiver which carry out communications according to a protocol such as TCP/IP, and methods used for these apparatus.

2. Description of the Related Art

As a protocol for carrying out interface communications, there is TCP/IP (Transmission Control Protocol/Internet Protocol).

TCP/IP was originally included in software for UNIX (registered trademark), and because of this historical background, processing is mainly performed with software is even today.

Lately, a large volume of AV (Audio Visual) data has been transferred over a network using TCP/IP. Accordingly, there is demand for speeding-up the TCP/IP processing.

The demand has conventionally been met by using a CPU (Central Processing Unit) capable of higher speed processing.

SUMMARY OF THE PRESENT INVENTION

However, such a CPU capable of high-speed processing is costly.

Also, it should be noted that an interface to a NIC (Network Interface Card) is currently connected to a PCI (Peripheral Component Interconnect) bus in view of versatility.

The PCI bus is mostly of the 32 bit/33 M standard used for a PC (Personal Computer). In this case, even if the TCP/IP processing, performance is increased due to a higher speed CPU, a transfer rate becomes a hindrance, thus making it difficult to improve overall performance. On the other hand, the use of a higher-speed PCI bus (64 bit/64 M standard or the like) is very expensive.

There is a similar problem when other protocols such as UDP (User Datagram Protocol) are employed.

For resolving or alleviating the above-mentioned problems of conventional techniques, it is desirable to provide a transmitter, a receiver, and/or methods for operating these apparatus, which are capable of carrying out higher speed communications processing with a protocol of simpler and lower cost configuration.

According to a first aspect of the present invention, a transmitter is provided. The transmitter of the first aspect includes a data generating circuit generating first module data including first contents data, an arithmetic circuit input/output interface outputting data required for transmitting processing of the first module data to an arithmetic circuit operating according to a preset program, and inputting first control data in response to a result of transmitting processing of the first module data from the arithmetic circuit, a data split circuit generating second control data based on the first control data, generating a plurality of second contents data by splitting the first module data, and generating a plurality of second module data that respectively include the second contents data and the second control data, and a transmission interface for transmitting the second module data.

The transmitter according to the first aspect of the present invention operates as follows.

The data generating circuit generates the first module data including the first contents data.

Next, the arithmetic circuit input/output interface outputs data required for transmitting processing of the first module data to the arithmetic circuit operating according to the preset program.

This processing is followed by the arithmetic circuit's processing in which the transmitting processing of the first module data according to inputted data is performed and the first control data is outputted in response to the result thereof to the arithmetic circuit input/output interface.

Subsequently, the data split circuit generates the second control data based on the first control data, generates a plurality of the second contents data by splitting the first module data, and generates a plurality of the second module data that respectively include the second contents data and the second control data.

Next, the transmission interface transmits the second module data.

According to the first aspect of the present invention, by making the arithmetic circuit perform the transmitting processing of the first module data, a processing load on the arithmetic circuit may be reduced as compared with a case of making the arithmetic circuit perform the transmitting processing of the plurality of the second module data.

In addition, all that is required for the arithmetic circuit is to output data required for generating the first control data, and a requirement of a transfer rate for a bus between the arithmetic circuit and the arithmetic circuit input/output interface can be relaxed.

Also, in the first aspect of the present invention, generation of the first module data and transmitting processing of the second module data are performed by the data split circuit that is hardware. Accordingly, the higher speed processing may be realized.

Furthermore, the arithmetic circuit input/output interface preferably outputs data required for generating the first control data to the arithmetic circuit.

Furthermore, the data split circuit preferably generates the second control data indicating a source address and a destination address, which are the source address and the destination address indicated by the first control data.

Still further, the second control data preferably includes checksum data of the second contents data stored in the second module, and the data split circuit generates the checksum data.

Furthermore, the first control data is preferably data indicating a destination and size of the first module data, and the second control data is data indicating a destination and size of the second module data.

Furthermore, the first module data and the second module data are preferably packet data, and the first control data and the second control are header data.

A transmitter according to a second aspect of the present invention includes a data generating circuit generating a first module data including a first contents data, an arithmetic circuit, which operates according to a preset program, carrying out transmitting processing of the first module data including the first contents data, and generating a first control data in response to a result of the transmitting processing, an arithmetic circuit input/output interface outputting data required for the transmitting processing of the first module data to the arithmetic circuit and inputting the first control data, a data split circuit generating a second control data based on the first control data, generating a plurality of second contents data by splitting the first module data, and generating a plurality of second module data which respectively include the second contents data and the second control data, a transmission memory circuit storing the plurality of the second module data, and a transmission interface transmitting the second module data read from the transmission memory circuit.

The transmitter according to the second aspect of the present invention operates as follows.

The data generating circuit generates the first module data including the first contents data.

Next, the arithmetic circuit input/output interface outputs data required for the transmitting processing of the first module data to the arithmetic circuit.

This processing is followed by operations of the arithmetic circuit according to the preset program. In the processing, the transmitting processing of the first module data including the first contents data is performed, the first control data is generated in response to a result of the transmitting processing, and the first contents data is outputted to the arithmetic circuit input/output interface.

Then, the data split circuit generates the second control data based on the first control data, generates a plurality of the second contents data by splitting the first module data, and generates a plurality of the second module data which respectively include the second contents data and the second control data.

The second module data is stored in the transmission memory circuit.

Subsequently, the transmission interface transmits the second module data read out from the transmission memory circuit.

A receiver according to a third aspect of the present invention includes an arithmetic circuit input/output interface outputting data required for receiving processing of first module data including first contents data and first control data to an arithmetic circuit operating according to a preset program and inputting a result of the receiving processing from the arithmetic circuit; a data reassemble/split circuit generating the first module data by reassembling a plurality of received second module data, which respectively include second contents data and second control data, and generating a plurality of the second contents data by splitting the first module data according to the result of the receiving processing which was inputted from the arithmetic circuit via the arithmetic circuit input/output interface; and an input/output interface outputting the second contents data obtained by the splitting processing.

The receiver according to the third aspect of the present invention operates as follows.

The data reassemble/split circuit reassembles the plurality of received second module data, which respectively include the second contents data and the second control data, and generates the first module data that include the first contents data and the first control data.

Next, the arithmetic circuit input/output interface outputs data required for the receiving processing of the first module data to the arithmetic circuit operating according to the preset program.

This processing is followed by processing of the arithmetic circuit in which the receiving processing of the first module data according to inputted data is performed and the result thereof is outputted to the arithmetic circuit input/output interface.

Subsequently, the data reassemble/split circuit splits the first module data according to the result of the receiving processing inputted from the arithmetic circuit via the arithmetic circuit input/output interface and generates the plurality of the second contents data.

Next, the input/output interface outputs the second contents data obtained by the splitting processing.

A receiver according to a fourth aspect of the present invention includes an arithmetic circuit carrying out, according to a preset program, receiving processing of first module data including first contents data and first control data, an arithmetic circuit input/output interface outputting data required for the receiving processing to the arithmetic circuit and inputting a result of the receiving processing from the arithmetic circuit, a receiving memory circuit storing a plurality of received second module data which respectively include second contents data and second control data, a data reassemble/split circuit generating the first module data by reassembling a plurality of the second module data and splitting the first module data according to the result of the receiving processing inputted from the arithmetic circuit via the arithmetic circuit input/output interface, and generating the plurality of the second module data, an input/output memory circuit storing the second contents data obtained by the splitting processing as mentioned above, and an input/output interface outputting the second contents data read out from the input/output memory circuit.

Furthermore, in a transmitting method according to a fifth aspect of the present invention, a data processing circuit generates first module data including first contents data, the data processing circuits outputs data required for transmitting processing of the first module data to an arithmetic circuit, the arithmetic circuit operates according to a program to perform the transmitting processing using inputted data and generates first control data in response to a result of the transmitting processing of the first contents data, the data processing circuit generates second control data based on the first control data, generates a plurality of second contents data by splitting the first module data, and generates a plurality of second module data which respectively include the second module data and the second control data, and the data processing circuit transmits the second module data.

Furthermore, a receiving method according to a sixth aspect of the present invention employs an arithmetic circuit that performs receiving processing of first module data including first contents data and first control data and a data processing circuit. The data processing circuit reassembles a plurality of received second module data respectively including second contents data and second control data to generate the first module data; the data processing circuit outputs data required for the receiving processing of the first module data to the arithmetic circuit; the arithmetic circuit performs the receiving processing by using data inputted from the data processing circuit; the data processing circuit further accepts an input of a result of the receiving processing from the arithmetic circuit, and generates a plurality of the second contents data by splitting the first module data according to the result of the receiving processing; and the data processing circuit outputs the second contents data obtained by the splitting processing as mentioned above to an external device.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENT

An embodiment of the present invention will be described below with reference to the accompanying drawings.

Figure 1:
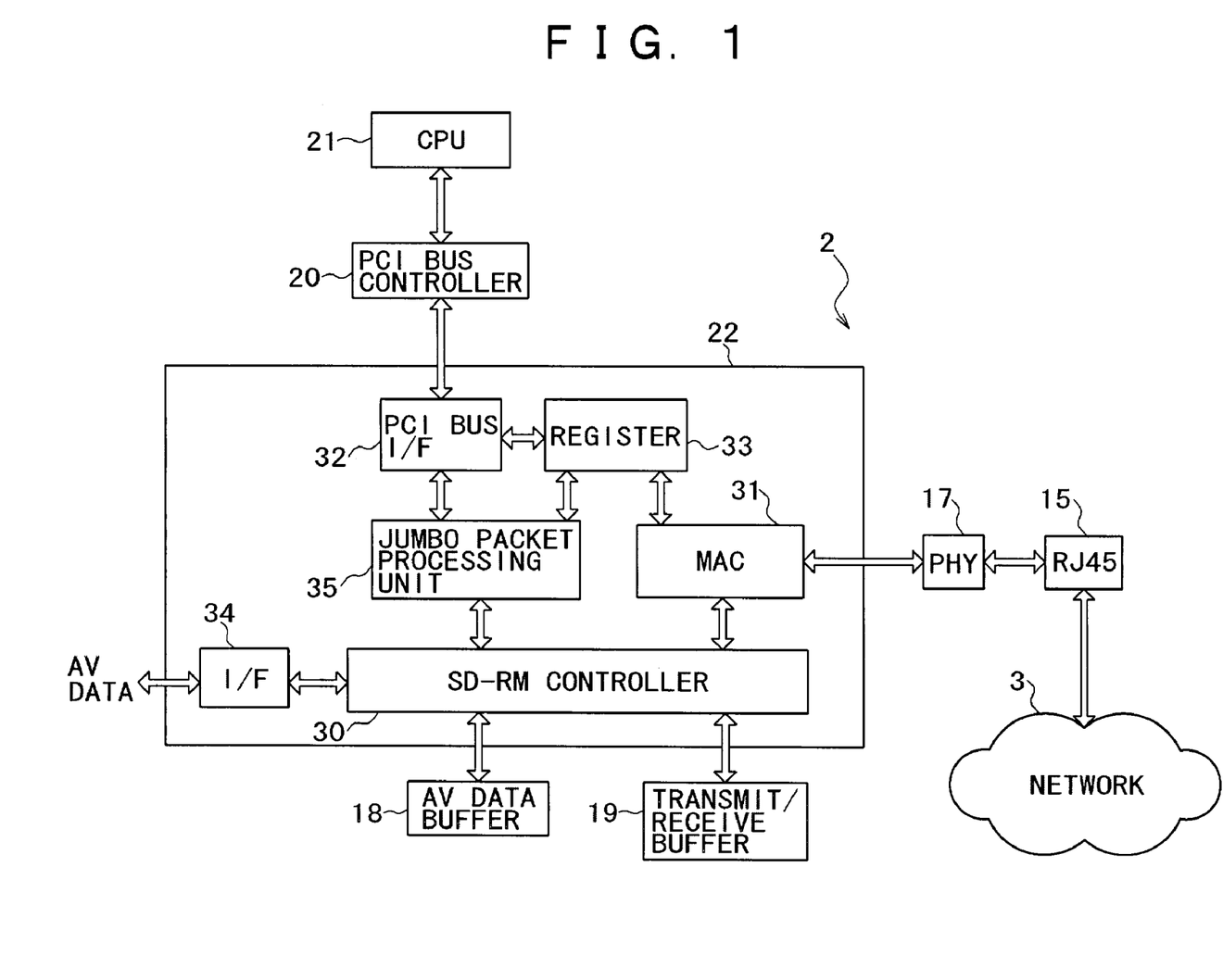
FIG. 1 is a schematic diagram showing an overall configuration of a communications system according to an embodiment of the present invention.

FIG. 1 is a schematic diagram showing an overall configuration of a communications system 1 according to a preferred embodiment of the present invention. As shown in FIG. 1, a computer 2 is connected to a network 3 in the communications system 1.

The computer 2 carries out transmission and reception of data such as AV data to other computers via the network 3 using a protocol such as TCP/IP.

At this point, the computer 2 or part thereof corresponds to a transmitter and a receiver of the present invention.

As shown in FIG. 1, the computer 2, for examples, has a connector 15, a pulse transformer 16 (not shown in the figure), a physical layer circuit 17, an AV buffer circuit 18, a transmit/receive buffer circuit 19, a PCI bus controller circuit 20, CPU 21, and a data processing circuit 22.

The AV buffer circuit 18 corresponds to an input/output memory circuit of the present invention, the transmit/receive buffer circuit 19 corresponds to a transmission memory circuit and a receiving memory circuit of the present invention, and the CPU 21 corresponds to an arithmetic circuit of the present invention.

The connector 15 is, for example, of the RJ-45 type, and is connected to a communications line connected to the network 3.

Packet data, which is transmitted or received by the computer 2 via the network 3, is routed through the pulse transformer 16 and outputted from the connector 15.

The physical layer circuit 17, for example, performs processing such as modulation and demodulation of signals of packet data (Ethernet packet) that is transmitted and received by the computer 2 via the network 3 using the Ethernet (trade mark) standards.

The AV buffer circuit 18 is an SD-RAM (Synchronous Dynamic-Random Access Memory) which stores AV data inputted or outputted between image/sound units such as external image/sound reproducer and the like of the computer 2.

The transmit/receive buffer circuit 19 is a RAM which stores packet data (Ethernet packet) transmitted to or received from the network 3 by the physical layer circuit 17.

The PCI bus controller circuit 20 controls data transfer via the PCI bus placed between the CPU 21 and the data processing circuit 22.

The CPU 21 executes application programs, and also performs TCP/IP processing related to the transmission and reception of packed data using a preset communications program.

The CPU 21 does not perform processing of AV data included in the packet data but performs processing related to header data (control data) included in the packet data.

More specifically, the processing performed by the CPU 21 include IP processing for delivering packet data to a destination computer via the network 3, ICMP (Internet Control Message Protocol) processing to notify an abnormality when an abnormal event occurs during packet transfer, ARP (Address Resolution Protocol) processing to perform conversion of an IP address and a MAC (Media Access Control) address, and TCP processing of the connection type which identifies a program carrying out communications and allocates a port accordingly.

The data processing circuit 22 is a piece of hardware performing reassembling and splitting of packet data that is transmitted or received by the computer 2 as well as certain processing that is included in the packet data transmitting and receiving processing by the computer 2 but not carried out by the CPU 21 according to programs.

As shown in FIG. 1, the data processing circuit 22, for example, has an SD-RAM controller 30, a MAC circuit 31, a PCI bus interface 32, a register 33, an AV interface 34, and a packet processing unit 35.

The PCI bus interface 32 corresponds to the arithmetic circuit input/output interface of the present invention, the packet processing unit 35 corresponds to the data generating circuit, the data split circuit, and the data reassemble/split circuit of the present invention, and the MAC circuit 31, the physical layer circuit 17, the pulse transformer 16, and the connector 15 correspond to the transmission interface of the present invention.

The SD-RAM controller 30 controls data transfer between the AV buffer circuit 18 and the transmit/receive buffer circuit 19; and the pulse transfer 31, the AV interface 34, and the packet processing unit.

The MAC circuit 31 performs MAC processing of packet data that are outputted/inputted between itself and the physical layer circuit 17.

The PCI bus interface 32 performs interfacing of data which are inputted or outputted between the register 33 and the packet processing unit 35; and the PCI bus controller circuit 20.

The register 33 stores data outputted/inputted via the PCI bus interface 32, and data subjected to the processing by the MAC circuit 31 and the packet processing unit 35 as well as resultant data of processing.

The AV interface 34 is an interface performing input/output of AV data between itself and the external image/sound processor of the computer 2.

Figure 2A:
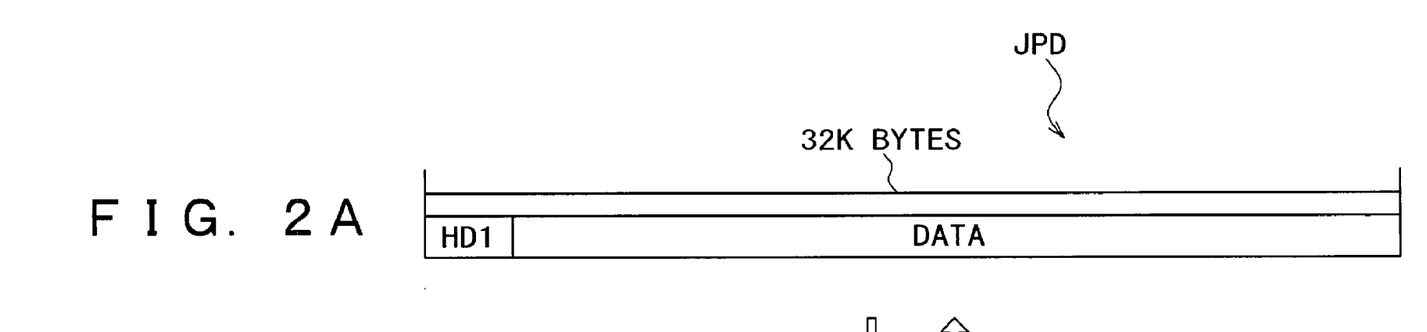
FIG. 2 is a diagram explaining generating processing and jumbo packet data and Ethernet packet data to be generated in a packet processing unit shown in FIG. 1.

The packet processing unit 35, when transmitting, reads AV data from the AV buffer circuit 18 and generates, for example, jumbo packet data (the first module data of the present invention) of 32 KB shown in FIG. 2A (the first contents data of the present invention) which are stored in a data sector of the AV data.

Furthermore, the packet processing unit 35, when transmitting, outputs data required for the transmitting processing of the jumbo packet data JPD from the PCI bus interface 32 to the CPU 21.

The packet processing unit 35, when transmitting, generates header data HD2 (the second control data of the present invention) used for transmitting packet data PD generated, as described later, in accordance with header data HD1 (the first control data of the present invention) inputted from the CPU 21.

Figure 3:
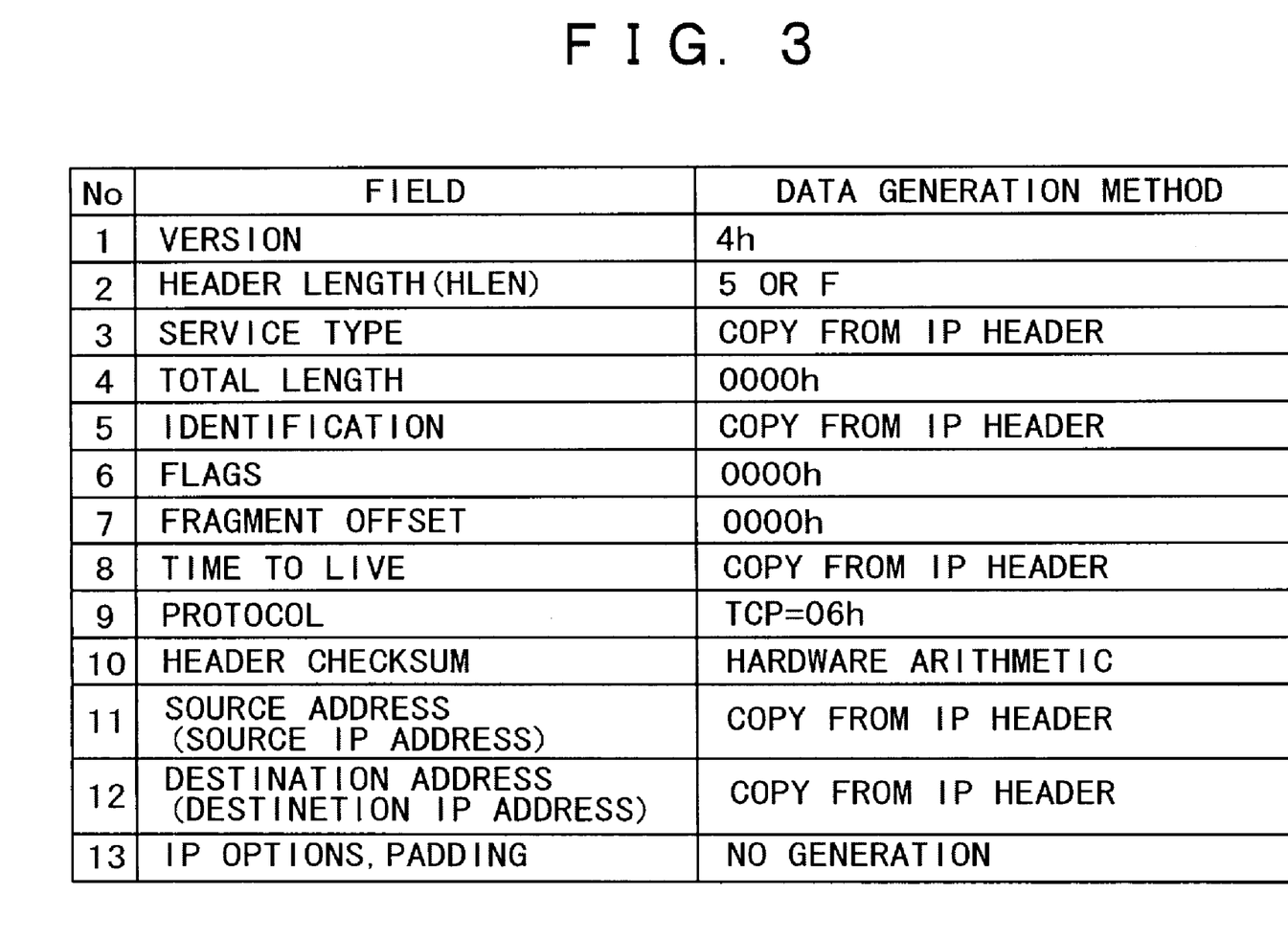
FIG. 3 is a diagram explaining processing to generate IP header data performed by a packet processing unit shown in FIG. 1.

At this instant, the packet processing unit 35, for example, as shown in FIG. 3, generates IP header data of the header data HD 2 by using (copying) the service type, time-to-live data, a source address, and a destination address of IP header data of header data HD 1 as they are.

Figure 4:
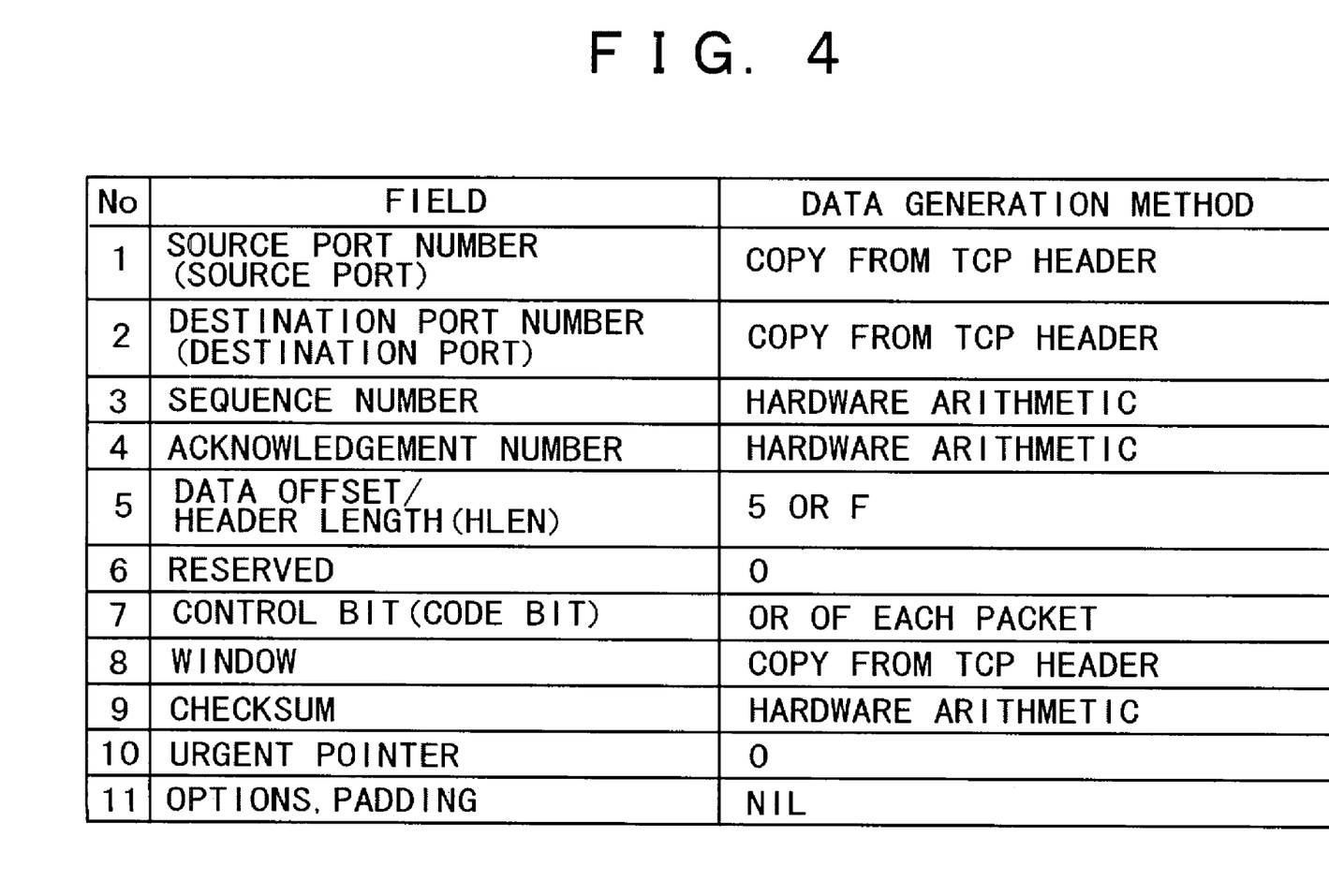
FIG. 4 is a diagram explaining processing to generate TCP header data performed by a packet processing unit shown in FIG. 1.

Additionally, the packet processing unit 35, for example, as shown in FIG. 4, generates TCP header data of the header data HD 2 by using source port number data, a destination port number and window data of TCP header data of header data 1 as they are.

Figure 2B:
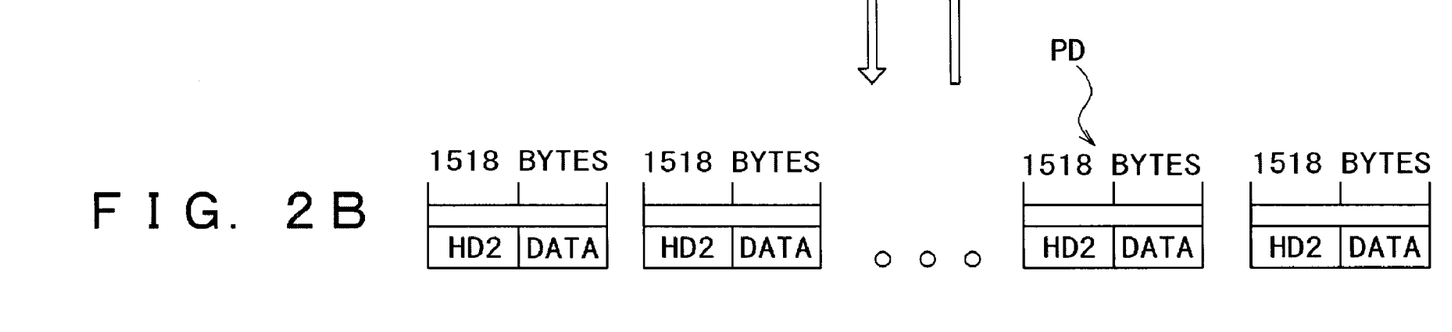

Further, the packet processing unit 35, when transmitting, splits AV data included in jumbo packet data JPD and generates packet data PD of a maximum packet length of 1518 byte (Ethernet packet data, the second module data of the present invention) which include respective AV data (the second contents data of the present invention) and the header data HD2 obtained by the splitting processing. FIG. 2B shows the packet data PD.

Still further, the packet processing unit 35, when transmitting, performs processing to generate the checksum data of IP headers of the header data HD1 and HD2 as well as checksum data, a sequence number, and a confirmation response number of the TCP header.

Furthermore, the packet processing unit 35, when receiving, reassembles a plurality of received packet data read from the transmit/receive buffer circuit 19. At the same time, the packet processing unit 35, when transmitting, for example, as shown in FIG. 3, generates IP header data of the header data HD1 by using the service type, the time-to-live data, the source address, and the destination address of IP header data of the header data HD2 as they are.

Also, the packet processing unit 35, for example, as shown in FIG. 4, generates the IP header data of the header data HD 1 by using the source port number data, the destination port number and the window data of TCP header data of the header data HD2 as they are.

Additionally, the packet processing unit 35, when receiving, performs processing to generate the checksum data of IP headers of the header data HD1 as well as the checksum data, a sequence number, and an acknowledgment number of the TCP header.

Still further, the packet processing unit 35, when receiving, performs checksum arithmetic using the IP header of the header data HD2 included in the packet data PD and the checksum data in the TCP header data as well as AV data.

Furthermore, the packet processing unit 35, when receiving, outputs to the CPU 21 data required for receiving processing of the jumbo packet data JPD, for example, a source address, a destination address, size data and the like obtained from the header data HD2 of the packet data PD from the PCI bus interface 32 via the PCI bus controller circuit 20.

Moreover, the packet processing unit 35, when receiving, generates packet data PD by splitting the jumbo packet data JPD according to the result of TCP/IP processing inputted from the CPU 21.

Operation examples of the computer 2 shown in FIG. 1 will be described below.

[Example of Transmitting Operation]

Figure 5:
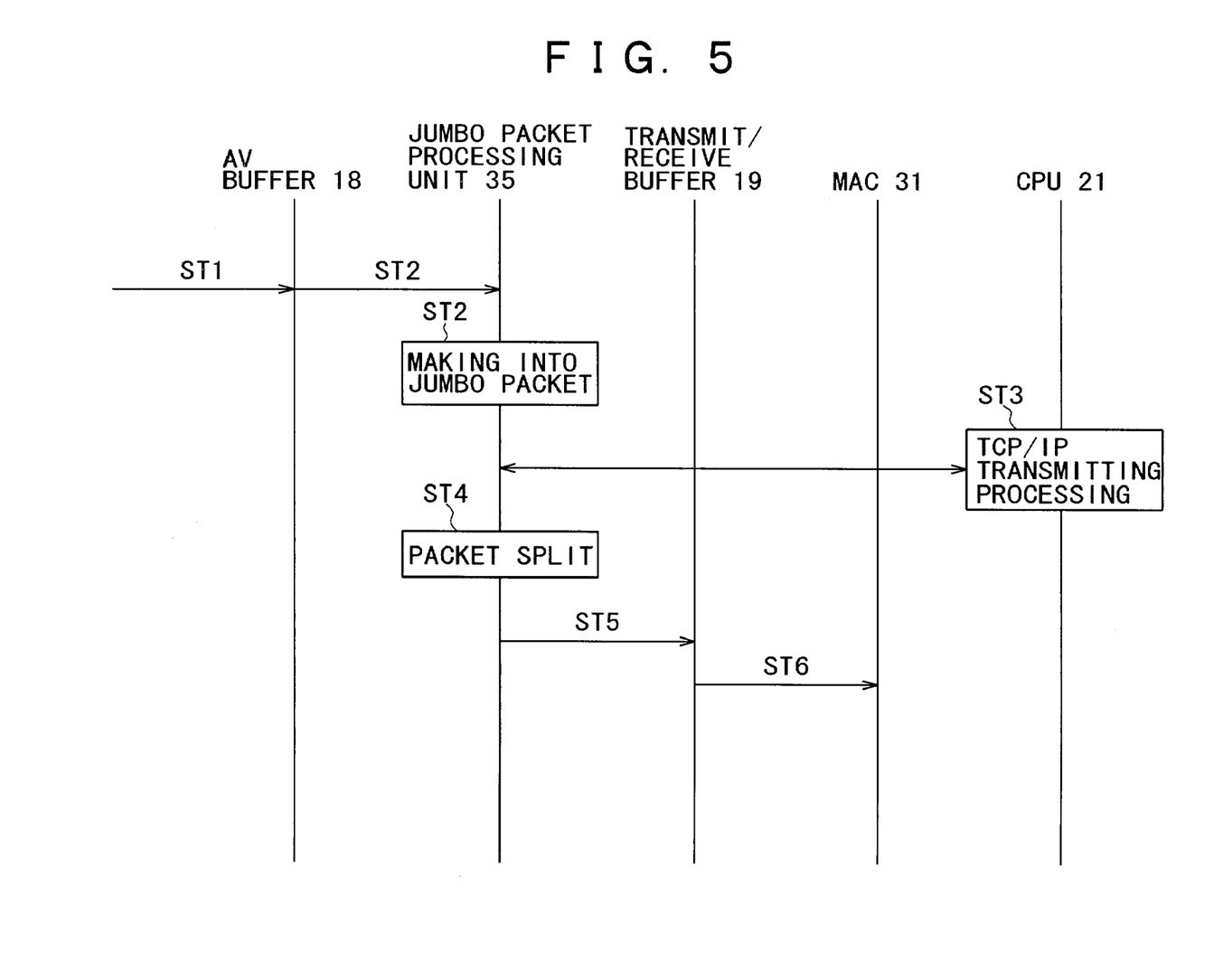
FIG. 5 is a flowchart explaining an example of operation when a computer shown in FIG. 1 transmits packet data via the network.

In the example of operation, there will be described a case where the computer 2 transmits packet data via the network 3. FIG. 5 is a flowchart explaining the example of operation. Each step shown in FIG. 5 will be described below.

[Step ST1]

AV data outputted from the image/sound processor according to the control of the SC-RAM controller 30 are written to AV buffer circuit 18 via the AV interface 34.

[Step ST2]

The packet processing unit 35 reads the AV data, which was written in step ST1, from the AV buffer circuit 18 and generates the jumbo packet data JPD shown in FIG. 2A in which the AV data are stored.

[Step ST3]

The packet processing unit 35 outputs data required for transmitting processing of the jumbo packet data JPD generated in step ST2 21 from the PCI bus interface 32 via the PCI bus controller circuit 20 to the CPU 21. Also, as necessary, data stored in the register 33 may be outputted to the CPU 21 via the PCI bus interface 32.

The CPU 21 performs TCP/IP processing for transmitting the jumbo packet data JPD by using data inputted from the packet processing unit 35 and generates the header data HD1.

Furthermore, the CPU 21 outputs the header data HD1 to the PCI bus interface 32 via the PCI bus controller circuit 20.

[Step ST4]

The packet processing unit 35 generates the header data HD2 to be used for transmitting the packet data PD according to the header data HD1 inputted from the CPU 21.

Then, the packet processing unit 35 splits AV data included in the jumbo packet data JPD and generates the packet data P which respectively include AV data and the header data HD2 obtained by the splitting processing.

[Step ST5]

The packet processing unit 35 writes packet data PD generated in step ST4 on the transmit/receive buffer circuit 19 according to the control of the SD-RAM controller 30.

[Step ST6]

The packet data PD are read from the transmit/receive buffer circuit 19 according to the control of the SD-RAM controller 30. And the packet data PD are transmitted from the connector 15, via MAC processing by the MAC circuit 31, physical layer processing to the physical layer 17, and the pulse transformer 16, to the network 3.

[Example of Receiving Operation]

Figure 6:
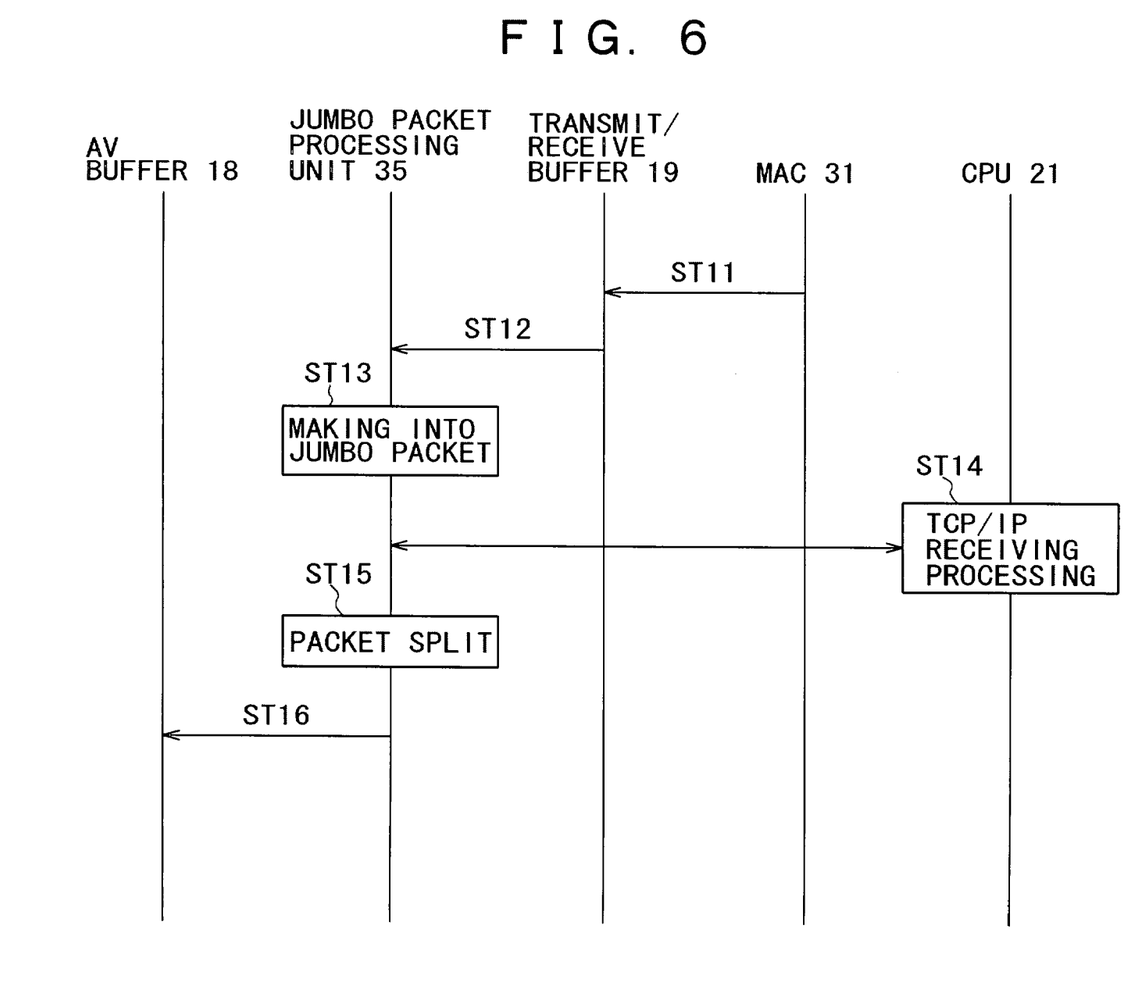
FIG. 6 is a flowchart explaining an example of operation when a computer shown in FIG. 1 receives packet data via the network.

In the example of receiving operation, there will be described a case where the computer 2 receives packet data via the network 3. FIG. 6 is a flowchart explaining the example of receiving operation. Each step shown in FIG. 6 will be described below.

[Step ST11]

Packet data PD moving on the network 3 are received by the connector 15, and inputted into the MAC circuit 31 via the pulse transformer 16 and physical layer processing by the physical layer circuit 17.

Furthermore, the packet data PD are written on the transmit/receive buffer circuit 19 via MAC processing by the MAC circuit 31.

[Step ST12]

In accordance with the control of the SD-RAM controller 30, a plurality of packet data PD are read from the transmit/receive buffer circuit 19 and outputted to the packet processing unit 35.

[Step ST13]

The packet processing 35 reassembles a plurality of packet data PD read in step ST12 and generates jumbo packet data JPD.

[Step ST14]

The packet processing unit 35 outputs to the CPU 21 data required for receiving processing of the jumbo packet data JPD, for example, a source address, a destination address, size data and the like obtained from header data HD2 of packet data PD via PCI bus controller circuit 20 from PCI bus interface 32.

Furthermore, the CPU 21, according to data inputted from the packet processing unit 35, performs TCP/IP processing for receiving the jumbo packet data JPD, outputting a result thereof to the packet processing unit 35 via the PCI bus controller circuit 20 and the PCI bus interface 32.

[Step ST15]

The packet processing unit 35, according to the processing result of the CPU 21 inputted in step ST14, splits the jumbo packet data JPD and generates packet data PD.

[Step ST16]

The packet processing unit 35, in accordance with the control of the SD-RAM controller 30, writes the packet data PD generated in step ST15 in the AV buffer circuit 18.

The packet data PD, in accordance with the control of the SD-RAM controller 30, are read from the AV buffer circuit 18 and outputted to the image/sound processor via the AV interface 34.

As the above-mentioned explanation shows, the computer 2 is so arranged that a data processing circuit 22 is incorporated therein, and that jumbo packet data JPD comprising a plurality of packet data PD are generated, making the CPU 21 perform transmit/receive processing (TCP/IP processing) of the jumbo packet data JPD. As a consequence, by comparison to a case where transmit/receive processing of the plurality of packet data PD is performed by the CPU 21, a processing load on the CPU 21 can be reduced.

Further, at this instant, by transferring only small volume data such as header data and register data between the CPU 21 and the data processing circuit 22 and performing part of TCP/IP processing in the data processing circuit 22 at high speed by means of hardware, the conventional PCI buss may be used as it is, and TCP/IP processing may be performed at high speed without making the CPU 21 operable at high speed.

Consequently, configuration of the computer can be made simple at a lower cost.

While the present invention has been described in its preferred embodiment, it is by no means limited thereby. Modifications may be made without departing from the spirit of the present invention. For example, in the above-mentioned embodiment, there is shown a case where TCP/IP is used by the computer 2 as a protocol. Nevertheless, the present invention is applicable when other protocols such as UDP are employed.

As apparent in the above-mentioned description, according to the present invention, a transmitter, a receiver, and methods for these apparatus can be provided at high speed in a simple and low cost configuration for communications processing in carrying out communications according to a protocol.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A transmitter transmitting content data over a network using Transmission Control Protocol/Internet Protocol (TCP/IP), the transmitter comprising:
    an arithmetic circuit configured to perform TCP/IP processing on first packet data and to generate first header data associated with said first packet data;
    a hardware processor circuit configured to generate from content data said first packet data for processing by said arithmetic circuit, and to split the TCP/IP processed first packet data so as to generate a plurality of second packet data and to generate a plurality of second packet TCP headers based on the first header data generated by said arithmetic circuit, and to attach respective ones of the second packet TCP headers to respective ones of the second packet data, the hardware processor circuit performing at least a checksum calculation, the checksum being a field contained in a second packet TCP header attached to a respective second packet data and;
    an interface configured to supply to said arithmetic circuit said first packet data from said hardware processor circuit for TCP/IP processing, and to supply to said hardware processor circuit the TCP/IP processed first packet data;
    wherein said first packet data is of a size greater than said second packet data.

2. A receiver receiving content data split into a plurality of packets through a network using TCP/IP, each packet of content data having a TCP header attached thereto, the receiver comprising:
    an arithmetic circuit configured to perform TCP/IP processing on assembled packet data and to generate first header data associated with said assembled packet data;
    a hardware processor circuit configured to assemble the plurality of received packets of content data so as to generate said assembled packet for processing by said arithmetic circuit and to generate a TCP header for the assembled packet based on the TCP headers attached to the received packets of content data, the hardware processor circuit being further configured to split an assembled packet supplied from said arithmetic circuit into a plurality of split packets, the hardware processor circuit performing at least a checksum calculation, the checksum being a field contained in a TCP header attached to a respective received packet of content data; and
    an interface configured to supply the assembled packet from said hardware processor circuit to said arithmetic circuit for performing TCP/IP processing therein based on the TCP header for the assembled packet, and to supply a TCP/IP processed packet from said arithmetic circuit to said hardware processor circuit to be split into said plurality of split packets.

3. A method of transmitting content data over a network using Transmission Control Protocol/Internet Protocol (TCP/IP), comprising the steps of:
    inputting data to be used in transmitting processing of the content data;
    generating from said input content data first packet data for TCP/IP processing;
    performing TCP/IP processing on said first packet data by an arithmetic circuit and generating first header data associated with said first packet data;
    splitting the TCP/IP processed first packet data to generate a plurality of second packet data;

generating a plurality of second packet TCP headers based on the first header data by a hardware processor circuit;

attaching respective ones of the second packet TCP headers to respective ones of the second packet data; and performing at least a checksum calculation, the checksum being a field contained in a TCP header attached to a respective split data;

wherein said first packet data is of a size greater than said second packet data.

4. A method of receiving content data split into a plurality of packets through a network using TCP/IP, each received packet of content data having a TCP header attached thereto, said method comprising the steps of:

assembling the plurality of received packets to generate an assembled packet of data;

generating a TCP header for the assembled packet based on the TCP headers attached to the received packets of content data;

performing TCP/IP processing of said assembled packet based on the generated TCP header for the assembled packet data;

splitting a TCP/IP processed packet into a plurality of split packets; and performing at least a checksum calculation, the checksum being a field contained in a TCP header attached to a respective received packet of data.

5. A transmitter comprising:

a data generating circuit for generating first module data including first contents data;

an arithmetic circuit operating according to a preset program for performing transmitting processing of said first module data, and generating first control data in response to said transmitting processing;

an interface to output said first module data to said arithmetic circuit data for said transmitting processing; said interface inputting said processed first module data and said first control data from said arithmetic circuit;

a data split circuit coupled to said interface for generating second control data based on said processed first control data, for splitting said processed first module data to generate a plurality of second module data, said second module data including contents data and said second control data;

a memory circuit storing said plurality of second module data; and an interface transmitting said second module data read from said memory circuit;

wherein said first module data is of a size greater than said second module data.

6. A receiver comprising:

an arithmetic circuit operating according to a preset program;

an interface to output to said arithmetic circuit data for supplying to said arithmetic circuit first module data including first contents data and first control data for processing by said arithmetic circuit and to receive processed first module data from said arithmetic circuit data;

a data assembly circuit coupled to said interface and operable to receive from an external source a plurality of second module data including contents data and second control data, and operable to generate said first module data by assembling said plurality of received second module data.

7. The receiver according to claim 6, wherein:

said data assembly circuit generates said first control data indicating a source address and a destination address identified by said second control data as the source address and the destination address.

8. The receiver according to claim 6, wherein:

said second control data includes checksum data of said contents data stored in respective second module data; and said data assembly circuit performs checksum processing by using said checksum data included in said second control data of the second module data.

9. The receiver according to claim 6, wherein:

said first control data are data indicating a destination and size of said first module data and said second control data are data indicating a destination and size of said second module data.

10. The receiver according to claim 6, wherein:

said first module data and said second module data are packet data, and said first control data and said second control data are header data.

11. A receiver comprising:

an arithmetic circuit operable according to a preset program for performing receiving processing of first module data that includes first contents data and first control data;

an interface outputting first module data to said arithmetic circuit data for said receiving processing by said arithmetic circuit and inputting processed first module data from said arithmetic circuit;

a receiving memory storing a plurality of received second module data, each including second contents data and second control data;

a data assembly circuit for assembling a plurality of said received second module data to generate said first module data for processing by said arithmetic circuit.

12. A transmitter comprising a data processing circuit and an arithmetic circuit, wherein:

said data processing circuit outputs first module data to said arithmetic circuit data for transmitting processing of said first module data by said arithmetic circuit, said first module data including first contents data;

said arithmetic circuit operates according to a preset program to perform said transmitting processing of said first contents data to generate first control data in response to said transmitting processing of said first contents data;

said data processing circuit (a) generates second control data based on said first control data, (b) generates a plurality of second contents data by splitting said processed first module data from said arithmetic circuit, and (c) generates a plurality of second module data, each of which includes said second contents data and said second control data; and said data processing circuit transmits said second module data to further apparatus;

wherein said first module data is of a size greater than said second module data.

13. A receiver comprising a data processing circuit and an arithmetic circuit, said arithmetic circuit configured to perform receiving processing of first module data that includes first contents data and first control data: wherein said data processing circuit generates said first module data by assembling said first module data from a plurality of received second module data, each said second module data including second contents data and second control data;

said data processing circuit outputs said assembled first module data to said arithmetic circuit data for said receiving processing by said arithmetic circuit; and said arithmetic circuit performs said receiving processing using data from said data processing circuit.

* * * * *